Jan. 14, 1936.  L. L. SCHAUER ET AL  2,027,705
DOUBLE DIAL CONTROL FOR HYDRAULIC RADIAL DRILLS
Filed March 28, 1933  4 Sheets-Sheet 1

Inventors
Lawrence Lee Schauer
John H. McKewen
By Attorneys
Nathan, Bowman & Helferich

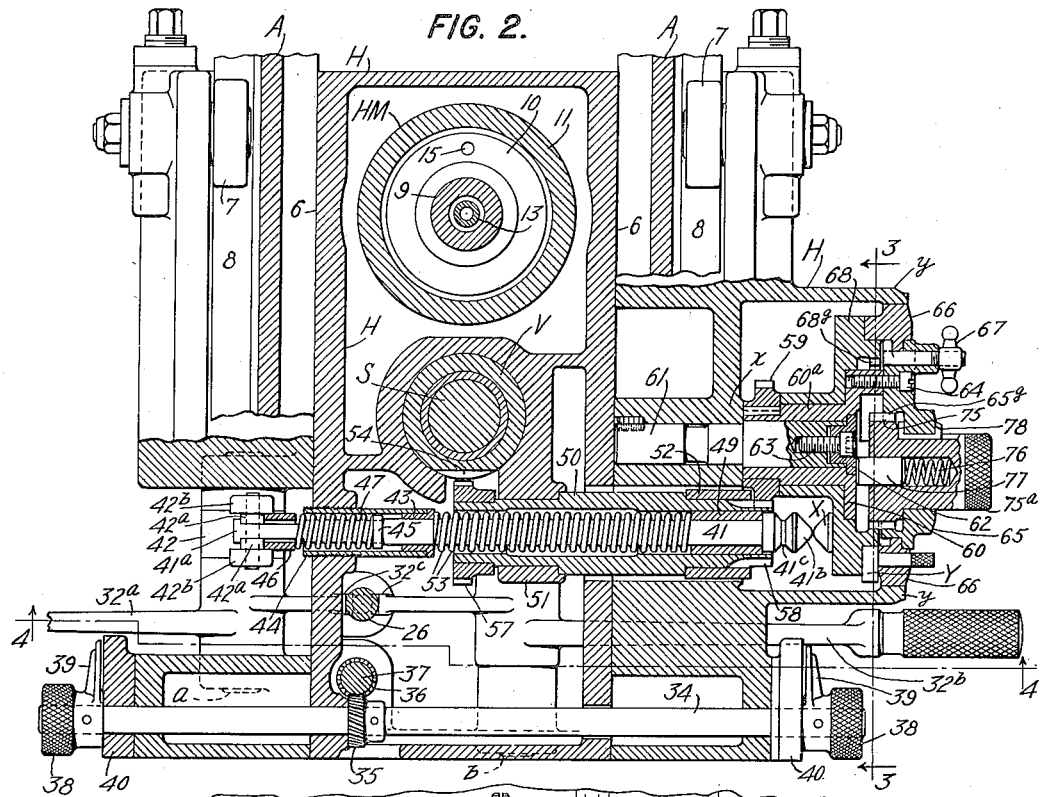

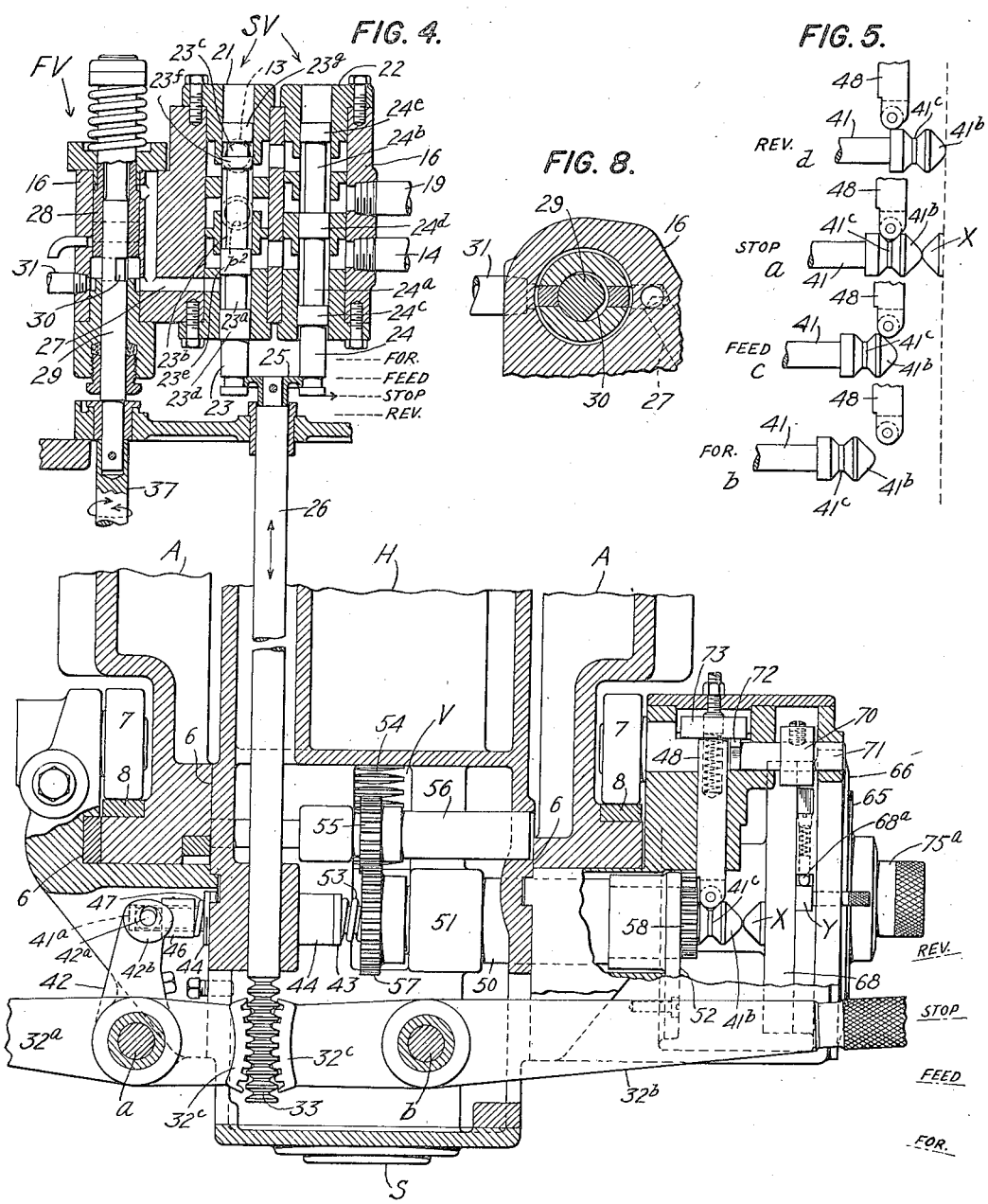

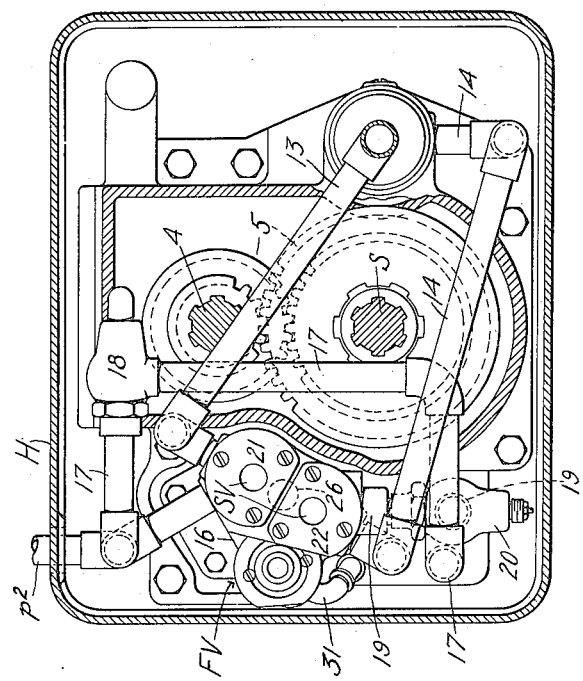
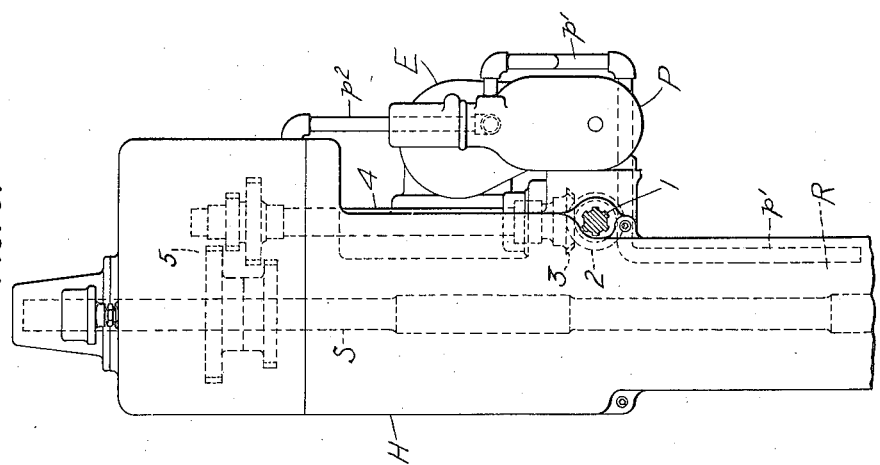

Patented Jan. 14, 1936

2,027,705

UNITED STATES PATENT OFFICE 2,027,705

DOUBLE DIAL CONTROL FOR HYDRAULIC RADIAL DRILLS

Lawrence L. Schauer, Wyoming, and John H. McKewen, Cincinnati, Ohio, assignors to The Cincinnati Bickford Tool Company, Cincinnati, Ohio, a corporation of Ohio Application March 28, 1933, Serial No. 663,167

19 Claims. (Cl. 77—32)

This invention deals with hydraulically actuated machine tools and it relates more particularly to improved means for regulating and controlling the movement of a translatable element thereof, such for example as the reciprocating tool spindle of a radial drill. More or less recently improved hydraulically actuated means have been provided for giving to a radial drill spindle its advancing and retracting movements at rapid traverse and feeding rates. Such means is disclosed in United States Patent No. 2,000,420 issued May 7, 1935 and in which the present applicants are joint inventors.

The present invention has as its primary object so to control such, or similar, hydraulic systems that the machine tool may be caused to operate through a predetermined cycle and yet be maintained constantly under the direct control of the operator.

More specifically stated, this invention has for an object to render available an improved control means for hydraulically actuated tool spindles whereby the spindle may be caused first to have a rapid traverse movement to bring the tool carried thereby into proximity to the work upon which it is to operate; next to cause the tool spindle to be given a slow advance movement at a feeding rate; then at a predetermined point, to discontinue the advance feeding movement; thereafter to retract the tool spindle and its attached tool at a rapid rate, and finally to arrest the translation of the spindle at any desired retracted position.

Another object is to provide simple means readily available to the operator whereby, at any time during the advance of the spindle, he may readily assume control and, if desired, discontinue the automatic cycle and cause the tool spindle to be retracted to its initial or stop position.

Still another object of this invention is to provide simplified means whereby the operator may readily vary the rate of feed of the tool spindle without varying the action of the pump which produces the actuating pressure.

A further object is to provide dual means, operative from both sides of the machine head, for manually controlling the action of the spindle translating means and for varying the rate of spindle feed.

A more specific object of this invention is to provide an improved form of feed throw-out device, or depth gauge, particularly adapted for an hydraulically fed spindle whereby the depth of the hole to be drilled may be accurately and automatically controlled.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2 is a horizontal sectional view substantially on the line 2—2 of Fig. 1 showing particularly the automatic control device for the spindle translating means and the duplex means for varying the feed rate, the automatic control device being shown in its neutral or stop position.

Fig. 3 is a vertical section substantially on the line 3—3 of Fig. 2.

Fig. 4 is a vertical sectional view substantially on the line 4—4 of Fig. 2 but with other parts broken away and showing, in conjunction therewith, a sectional development of the direction and rate controlling valves.

Fig. 5 is a diagrammatic illustration of the various positions assumed by the control plunger during a normal cycle of operation.

Fig. 6 is a right end view of the upper portion of the tool head showing more particularly portions of the hydraulic system and the drive from the arm shaft to the spindle.

Fig. 7 is a horizontal sectional view through the upper portion of the tool head showing, in plan, the relative positions of the control valves with respect to the tool spindle and hydraulic motor.

Fig. 8 is a section through the feed rate control valve.

Figure 1:
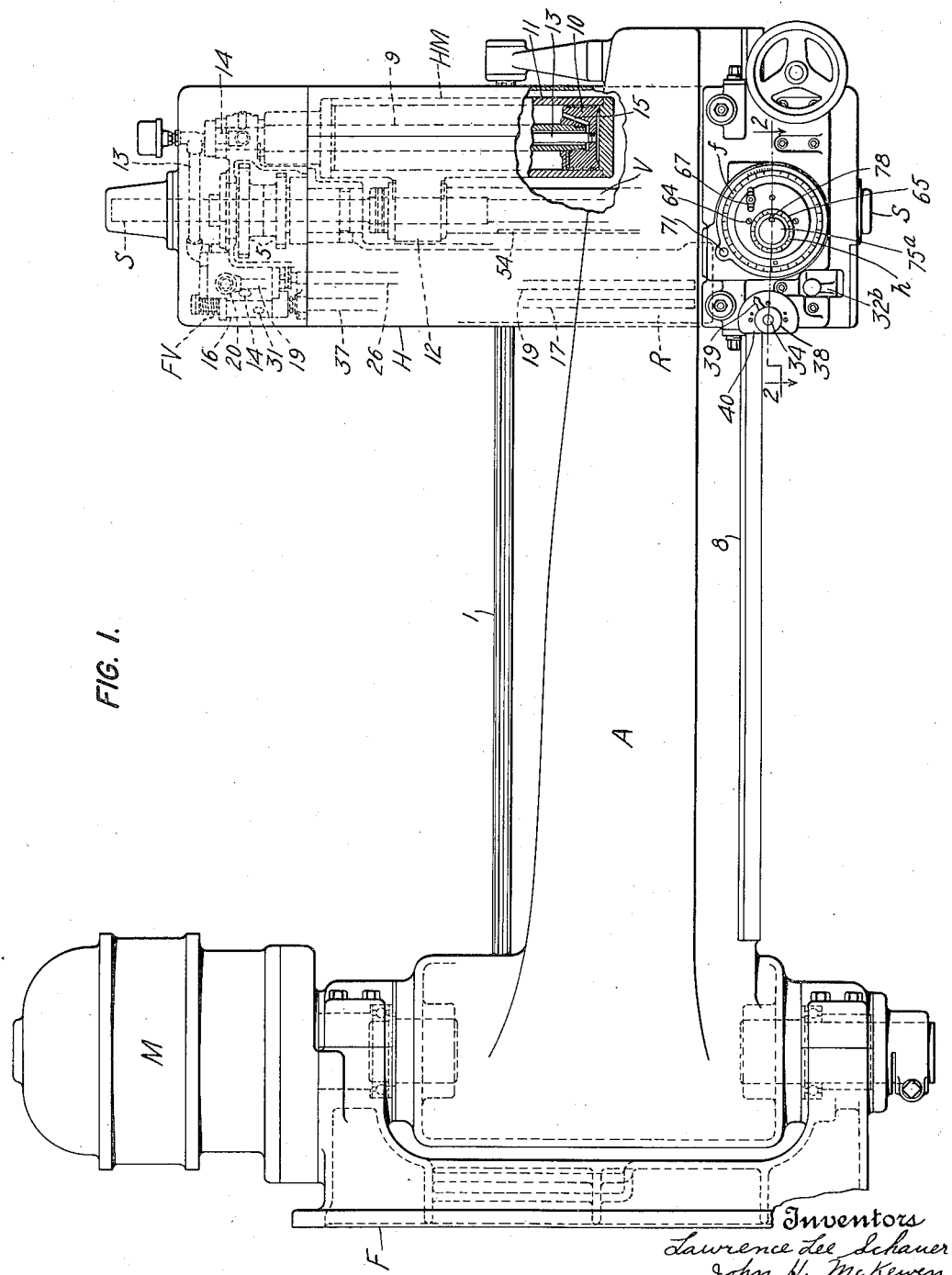
Figure 1 is a side elevation of one form of radial drill embodying the present invention.

Referring more specifically to the drawings, the invention is disclosed as embodied in a radial drill comprising a support or frame F, a bifurcated radial arm A pivotally mounted on said support, and a tool head H translatably mounted on the arm and carrying the usual tool spindle S. As shown in the drawings, the support for the arm consists of a bracket adapted to be secured to a vertical wall or other suitable standard but, obviously, it may be mounted upon the conventional upright column or in any other suitable or preferred manner.

The tool spindle is rotatably but non-translatably journaled in a sleeve V which, in turn, is translatably but non-rotatably mounted in the tool-head. Any suitable means may be provided for rotating the spindle. As shown herein this means comprises an electric motor M supported upon the bracket F and connected to rotate a shaft 1 extending lengthwise of the arm. Splined to the shaft 1, and carried by the tool-head, is a bevel gear 2 which, through a similar bevel gear 3, an upright shaft 4 and change gears, designated generally as 5, rotate the tool spindle in the translatable sleeve V.

The tool-head is fitted to suitable guideways 6 provided by the arm A and the weight of the head is supported on a plurality or rollers 7, carried by the tool-head, and which track hardened wear plates 8 supported by and extending lengthwise of the arm. Thus the tool-head is translatably mounted on the arm and the motor M, shaft 1 and the driving connection, above described, serve to rotate the tool spindle in all of the positions of the head on the arm.

As hereinbefore stated, this invention is particularly useful in connection with an hydraulically reciprocated tool spindle. To effect reciprocation of the spindle the tool-head is provided with a self-contained hydraulic system comprising a reservoir R, for oil or other suitable fluid, an hydraulic pump P, adapted to draw fluid from the reservoir, an hydraulic motor HM, operatively connected with the spindle and adapted to receive the fluid discharged by the pump, and suitable conduits and valves later to be described. The pump P may be driven from any suitable source of power but preferably it is driven by an electric motor E secured upon one side of the tool-head. The hydraulic motor which receives the actuating fluid preferably comprises a stationary tubular piston-rod 9 secured at one end to a portion of the tool-head. The opposite end of the rod 9 carries a piston 10, fitted within the bore of a reciprocating cylinder 11, slidingly mounted in the tool-head and connected, by a bracket 12, with the reciprocating spindle sleeve V, within which the spindle is rotatably journaled.

Connected with the upper end of the piston rod 9 are two conduits, 13 and 14, adapted selectively to serve as intake and discharge lines for the hydraulic motor. The conduit 13 extends through the piston rod and through the piston head and has its open end in communication with the bore of the cylinder beneath the piston, whereby flow of fluid therethrough will cause the cylinder 11, and the spindle sleeve and spindle carried thereby, to be shifted downwardly, or toward the work. Conduit 14 connects with the bore of the tubular piston rod and fluid flowing therethrough passes downwardly through the piston rod, about the conduit 13 into the piston head and then outwardly to the upper side thereof through duct 15 formed in the piston head. Thus fluid pressure supplied through conduit 14 will flow into the cylinder 11 above the piston 10 thereby causing the cylinder and the parts attached thereto to be moved upwardly or away from the work. It will be understood that as fluid under pressure is transmitted into the hydraulic motor through one of the conduits 13 or 14 the other conduit will serve as a discharge conduit to conduct exhaust fluid back to the reservoir. The rate and direction of flow through the conduits 13 and 14 are determined and controlled by valves later to be described.

Pump P draws fluid from the reservoir R through conduit $p^1$ and discharges it through conduit $p^2$ into a valve casing 16 which valve houses the combined rate and direction control valves and also the separate feed rate control valve. A by-pass line 17, connected with the discharge line of the pump and controlled by a pressure relief valve 18, limits the amount of pressure capable of being built up in the system and returns the excess fluid to the reservoir. Fluid discharged from the hydraulic motor through either of the conduits 13 or 14, during rapid traverse movement of the spindle, flows back to valve casing 16 and from there is returned to the reservoir through a conduit 19 having therein a pressure relief valve 20 adapted to maintain the system charged and to provide sufficient back pressure to prevent undue acceleration or overrunning of the parts. The conduit 19 also serves to return to the reservoir the fluid discharged by the pump when the rate and direction control valves SV, hereinafter called the selector valves, are in their neutral or stop position, as shown in Fig. 4.

The selector valves comprise the casing 16, which is suitably drilled and tapped to receive the conduits $p^2$, 13, 14 and 19, ported valve sleeves 21 and 22 fitted within the casing and valve pistons 23 and 24 slidably fitted within the sleeves 21 and 22. Valve piston 23 is formed with reduced portions $23^a$, $23^b$ and $23^c$ and larger cylindrical portions $23^d$, $23^e$, $23^f$ and $23^g$ while the valve piston 24 is provided with reduced portions $24^a$ and $24^b$ and larger cylindrical portions $24^c$, $24^d$ and $24^e$. The valve pistons 23 and 24 are tied together by a crosshead 25 secured upon one end of an endwise movable rod 26 slidably mounted in the tool-head. As indicated in Fig. 4 the rod 26 and the valve pistons carried thereby are adapted to be shifted vertically to four positions of adjustment to wit:—1st an upper position in which they so position the reduced portions relative to ports formed in the sleeves 21 and 22, with which the various conduits are connected, as to cause fluid to be discharged into the lower end of the hydraulic motor thereby to effect a forward or downward movement of the spindle at a relatively rapid rate; 2nd a next lower position which effects a relatively slow advance movement at a feeding rate; 3rd a next lower, or stop, position which causes the pump discharge line to be isolated from the hydraulic motor and connected directly with the reservoir thereby arresting the translatory movement of the spindle; and 4th, a lowermost position which causes fluid from the pump to be admitted into the upper end of the hydraulic motor thereby to retract the spindle at a relatively rapid rate.

The rate at which the spindle is advanced during a feeding movement is regulated by the setting of a throttle or feed rate control valve FV connected, during the feeding movement of the spindle, in the discharge line of the motor and adapted to regulate and control the rate of discharge which thereby determines the rate at which the spindle may be advanced by the actuating fluid. For convenience of manufacture the feed rate control valve is preferably located within the casing 16, which also houses the selector valves, and is connected with the latter valves by a port 27. The throttle valve comprises a ported sleeve 28 having rotatably journaled therein a valve stem 29 having therein a reduced eccentrically formed portion 30 adapted, in its various positions of angular adjustment, to restrict, more or less, the flow of fluid discharged by the motor. A conduit 31 extends from the throttle valve to the reservoir to return thereto the fluid discharged by the motor.

From the foregoing it will be perceived that there has been provided an hydraulic system for effecting reciprocations of the tool spindle at rapid traverse and feeding rates; that the axial position of the selector valve pistons 23 and 24 control the direction of translation (and also the stopping) of the spindle and determine whether the movement shall be at a traverse or a feeding rate; and that the angular position of the feed rate control valve stem 29 determines the rate of feed. Means also is provided, which acts in conjunction with the feed rate control valve, for maintaining the feed rate constant under any given setting of the feed rate control valve irrespective of varying working conditions. This means, however, forms no part of the present invention and detailed illustration and description thereof is deemed unnecessary in this application.

To enable the operator to have complete control of the direction and rate of movement of the tool spindle there are secured, upon shafts $a$ and $b$ journaled in the tool-head, a pair of oppositely extending hand levers 32$^a$ and 32$^b$ each having, at one end, a knurled hand grasp and, at the other end provided with a segmental gear portion 32$^c$ engaging teeth of a cylindrical rack 33 formed on the lower end of the endwise movable valve actuating rod 26. Also carried by the tool-head is a manually rotatable shaft 34 having secured to it, intermediate its ends, a spiral gear 35 which meshes with a similar gear 36 secured upon the lower end of a feed rate control shaft 37, to the upper end of which the feed rate control valve stem 29 is secured, as shown in Fig. 4. Knurled hand wheels 38 fixed upon either end of the shaft 34, and provided with indicating pointers 39, serve as means to permit the operator to rotate the shaft 34 to vary the angular position of the valve stem 29 and the eccentric port 30 thereby to regulate the rate of discharge from the motor. Each of the pointers 39 may cooperate with a suitable dial 40 to indicate the rate of feed obtained by any given setting of the pointer.

The present invention is concerned particularly with the provision of means for automatically producing a preselected cycle of movement of the tool spindle. This has been attained by the provision of a regulatable device, now to be described, which automatically shifts the rod 26, and the valve pistons 23 and 24 connected thereto, endwise at predetermined times thereby to cause the spindle to be given a rapid traverse advance movement, a slow feed movement, a rapid return movement, and then to be brought to rest, all in a predetermined cycle, which cycle may be varied at will. This device is actuated by the reciprocating movement of the spindle sleeve V.

Mounted within the lower end of the tool-head is a horizontally disposed spring pressed control plunger 41 one end of which is provided with a head 41$^a$ engaged by studs 42$^a$ projecting from the upstanding arms 42$^b$ of a member 42 secured upon the shaft $a$ to which the hand lever 32$^a$ also is secured. Intermediate its ends the plunger 41 is slidingly mounted in a bushing 43, supported by a sleeve 44, adjustably mounted in the tool-head, and has affixed thereto a collar 45. Another collar 46 is mounted loosely on the plunger 41, and a coil spring 47, surrounding the plunger intermediate the collars 45 and 46, serves normally to maintain the collar 46 in contact with the studs 42$^a$ which, together with the head 41$^a$, serves as an operative connection between the plunger and the arm 42$^b$ of the member 42. This connection, however, permits the lever 32$^a$ and the member 42 to be shifted in one direction, for a purpose later to be explained, without moving the plunger 41.

The opposite end of the plunger is provided with a head 41$^b$ formed with a conical end and an annular groove 41$^c$ adapted, under certain conditions, to be engaged by a spring pressed retaining pawl, or detent, 48 later to be referred to. Immediately back of the head 41$^b$ a bushing 49 surrounds the plunger 41 and forms a bearing therefor. This bushing is slidingly mounted within a bore formed in a rotatable sleeve 50 journaled, at one end, in a bearing 51 provided by a portion of the tool-head and, at the opposite end, in a bearing bracket 52 secured to the tool-head (see Fig. 4). A coil spring 53, surrounding the plunger 41 and interposed between the bushings 43 and 49, normally urges the plunger 41 to the right as viewed in Fig. 2. Inasmuch as the plunger 41 is connected with the valve actuating rod 26 through the medium of the member 42 shaft $a$ and lever 32$^a$ it will be perceived that axial movement of the plunger will effect axial movement of the rod 26 and the position of the valve pistons 23 and 24 may be determined by the position of the plunger.

At one side, the spindle sleeve V is provided with a rack 54, the teeth of which are engaged by a gear 55 mounted on a shaft 56 carried by the tool-head. That gear meshes with a gear 57 secured upon one end of the sleeve 50, before mentioned. The opposite end of the sleeve is provided with a gear 58 which meshes with and drives a gear 59 keyed to the hub 60$^a$ of a disc 60 rotatably journaled on a stud 61 fixed in the tool-head. A circular plate 62 held upon one end of the stud 61, by screw 63, together with the wall $x$ of the tool-head, maintain the disc 60 on the stud 61 and permit its free rotation thereon.

Secured to the disc 60, as by screws 64, is a dial plate 65, mounted, for angular adjustment, in a separately adjustable dial plate 66 rotatably mounted in a portion $y$ of the tool-head. A clamp device designated generally as 67 serves to lock the dial plates 65 and 66 so that they may be rotated synchronously by the disc 60.

Rotatably journaled upon the hub 60$^a$ of the disc 60 is a drum 68 which carries a trip dog X adapted when the spindle has been retracted to a preselected position to engage the head 41$^b$ of the control plunger 41 thereby to shift the selector valves to their neutral or stop position. A second trip dog Y is carried by the dial plate 66. This dog operates in one direction only, that is during downward movement of the spindle, and acts at a predetermined time, as determined by the setting of the dial plate, to cause the control plunger to be shifted from a feed position to a rapid traverse position as will hereinafter be more fully described. A spring pressed plunger 68ª holds the trip dog in a position to act during downward movement of the spindle but permits it to be shifted to an ineffective position during retraction of the spindle.

As illustrated in Fig. 5 the control plunger 41 is adapted to occupy any one of four positions a, b, c or d. These positions correspond to the four positions of the selector valves 23, 24 indicated in Fig. 4 which effect respectively "Stop" "Forward rapid traverse", "Feed" and "Reverse rapid traverse" of the tool spindle.

An automatic cycle of operation may be explained as follows: At the end of a previous cycle the machine was brought to rest with the control plunger in the "Stop" position a (Fig. 5) and the valves 23 and 24 in the "Stop" position shown in Fig. 4. To start a new cycle the operator having, by rotation of one of the hand wheels 38, set the valve FV to produce the desired rate of feed, pulls downwardly on one of the hand levers 32ª or 32ᵇ thereby shifting the rod 26 upwardly to position the valves 23 and 24 in their uppermost position to effect rapid traverse downward movement of the spindle. This movement of the control lever also causes the member 42 to be turned counter-clockwise, as viewed in Fig. 4, which overcomes the pressure of the retaining pawl 48 and shifts the plunger 41 to the left from the position a to the position b. When the tool has almost reached the work the operator moves the control lever 32ª or 32ᵇ upwardly one step which shifts the valves 23, 24 downwardly to the "feed" position, the plunger 41 moving from the position b to the position c in which position it is held by the spring pressed pawl 48. After a predetermined downward feed of the spindle, as is determined by the angular setting of the dial plate 66, the feed trip dog Y engages a cam shoulder 69 (see Figs. 3 and 4) formed on a disc 70 secured upon one end of a rock shaft 71 journaled in the tool-head.

The other end of the rock shaft is provided with laterally projecting shoulders 72 arranged beneath a disc 73 fixed upon the upper end of the spring pressed detent pawl 48. Engagement of the dog Y with the cam 69 causes rotation of the rock shaft 71 whereupon one of the shoulders 72 raises the disc 73 and the pawl 48 connected therewith, thereby lifting the lower end of the pawl out of engagement with the head of the spring pressed plunger 41. The plunger thereupon is shifted to the extreme right position d and the valves 23, 24 are shifted to a position to effect rapid retraction of the spindle.

As the spindle reaches its uppermost position, which may be predetermined by the setting of the drum 68, the stop dog X engages the head 41ᵇ of the plunger 41 and shifts it from the position d back to the stop position a which movement of the plunger also shifts the valves 23, 24 upwardly to their stop position, thus completing the cycle.

As hereinbefore stated, the dial 65 is secured to and rotated with the disc 60 by the translatory movements of the spindle sleeve. Also that the dial 66 is normally clamped to the dial 65 by the clamp device 67 but may be released therefrom to permit angular adjustment of the dial 66 and the trip dog Y carried thereby to predetermine the depth to which the hole is to be drilled. Graduations f, formed on the dial plate 66, cooperate with a suitable indicator on the stationary part y of the tool-head to indicate the depth of feed obtainable in any given setting of the dial 66. Normally the drum 68 is rotated synchronously with the disc 60 and the dials 65 and 66. This is effected by locking the drum to the dial 65. To that end the drum 68 is formed with an internal gear 68ᵍ, best shown in Figs. 2 and 3. The dial plate 65 is likewise provided with an internal gear 65ᵍ formed eccentrically thereof and which, at one point, has its teeth aligned with the teeth of the internal gear 68ᵍ. Slidingly mounted in the dial plate 65 is the hub 75ª of a spur gear 75, the teeth of which normally fit clutch-like within the teeth of the internal gear 65ᵍ. The gear 75 is of greater width than the gear 65ᵍ and projects to one side thereof and at one point, that is, where the teeth of the gears 65ᵍ and 68ᵍ are aligned, also meshes with the teeth of the gear 68ᵍ thereby locking the drum 68 and the dial plate 65 against relative rotation. Means is provided for disengaging the gear 75 from the gear 65ᵍ while yet maintaining it in mesh with the gear 68ᵍ whereby, by rotation of the gear 75, the drum 68 may be adjusted angularly relative to the dial plate 65 thereby so to locate the stop dog X that the spindle may be brought to rest during its upward movement at any desired point. For this purpose clearance is provided at the left of the gear 75 (as seen in Fig. 2) whereby the gear may be shifted to the left in opposition to a spring 76 fitted within a bore in the hub of the gear 75 and which, at one end engages a plunger 77 maintained in contact with the plate 62. The other end of the spring bears against the bottom of the bore and normally forces the gear 75 into clutching engagement with the gear 65ᵍ. The outer end of the hub 75ª of the gear 75 is knurled to facilitate rotation of the gear when it has been disengaged from the gear 65ᵍ. An indicator 78, carried by the hub of the gear 75 cooperates with suitable graduations h on the dial plate 65 to indicate the uppermost position of the spindle in any given setting of the drum 68.

From the foregoing it will be perceived that there has been provided an improved control which is particularly useful for hydraulically actuated tool spindles and which, by adjustment of the parts, permits various cycles of operation automatically to be obtained. At any time during the automatic cycle the operator may assume control and, if desired, discontinue the cycle and cause the spindle to be retracted and brought to rest. This latter may be effected by merely raising either of the levers 32ª or 32ᵇ to its uppermost position, this being permitted by the lost motion connection between the member 42 and the plunger 41.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of United States:—

1. In a drilling machine having a reciprocable spindle, an hydraulic system including a motor for effecting reciprocations of said spindle, direction control valve means embodied in the intake conduit of said motor to determine the direction of movement of said spindle; a second valve means adapted to be connected in the exhaust conduit of said motor to restrict the discharge from the motor thereby to reduce the rate of movement of the spindle to a feeding rate; means to adjust said second valve means thereby to vary the feeding rate; manual means for actuating said direction control valve means; and automatic means actuated by the reciprocatory movements of said spindle for actuating said direction control valve means and for rendering said second valve means effective in a predetermined sequence, thereby to effect a predetermined cycle of movement of said spindle.

2. In a drilling machine having a head; a spindle reciprocably mounted therein, and an hydraulic system carried wholly by said head for effecting translation of said spindle, a selector valve embodied in said hydraulic system for determining the direction of translation of said spindle; an adjustable feed rate control valve embodied in said system and associated with said selector valve for determining the rate of feed of said spindle; manual means for adjusting said feed rate control valve comprising an oscillatory shaft journaled in said tool head and operatively connected with said feed rate control valve; a manually adjustable shaft journaled in said tool head and projecting from opposite sides thereof; an operative connection between said shafts; hand wheels secured upon the opposite ends of the manually adjustable shaft; an indicator connected with each of said hand wheels; and a dial plate adjacent each indicator and cooperating therewith to show the rate of feed produced by any given setting of said manually actuable shaft.

3. A drilling machine combining a tool head; a sleeve reciprocably mounted in said tool head; a tool spindle rotatably journaled in said sleeve; an hydraulic system including a source of fluid pressure and an hydraulic motor connected therewith to effect reciprocations of said sleeve and spindle; valve means in said system to determine the rate and direction of translation of said sleeve and spindle; automatic means for actuating said valve means to effect a predetermined cycle of movement of said sleeve and spindle, said automatic means including a control plunger operatively connected with said valve means; means normally urging said plunger to a position in which it effects retraction of said sleeve and spindle; means to shift said plunger and valve means to a position in which they effect forward movement of said sleeve and spindle; means to retain the plunger in said position; a dial rotated by the movement of said sleeve; and a trip dog carried by said dial and adapted to release said retaining means thereby to permit said plunger and the valve connected therewith to be moved to a position to effect retraction of said sleeve and spindle.

4. In a drilling machine having a tool-head provided with a relatively reciprocable spindle; an hydraulic system carried wholly by said head for reciprocating said spindle; valve means embodied in said hydraulic system for determining the rate and direction of reciprocation of said spindle; manual means carried by said tool-head and operable at will to actuate said valve means to any position but normally operable to set the valve means to effect a forward movement of said spindle; automatic control means actuated by the reciprocatory movement of said spindle thereafter to actuate said valve means automatically a plurality of times thereby first to arrest the forward movement of the spindle at a predetermined point, then to cause it to be retracted at a relative rapid rate and finally to bring it to rest in a predetermined retracted position; means to adjust said automatic control means thereby to vary the point of automatic reversal and to vary the position of the stopping point of the spindle relative to the point of reversal; and yielding means between said automatic means and said valve to permit independent actuation of said valve by the manual means to thereby independently effect a change in the cycle of movement prescribed by said automatic means.

5. In a drilling machine having a tool-head and a tool spindle translatably mounted in said tool-head, an hydraulic system carried by said tool-head for effecting reciprocation of said spindle relative to said head, said system comprising an hydraulic motor connected with the spindle; a reservoir for the actuating fluid; a pump for drawing fluid from said reservoir and discharging it into said motor; a system of conduits connecting said reservoir, pump and motor, and a selector valve embodied in said conduits for selectively admitting fluid into opposite ends of said motor and for isolating said motor from said pump to arrest the translation of the spindle; automatic means including rotary members actuated by the translatory movements of said spindle and provided with trip dogs, and a control member adapted to be actuated by said dogs, to effect automatic actuation of said selector valve thereby to produce a predetermined cycle of movement of said spindle; and manual means and operative connections with said valve operable at will to control the movement of said valve independently of said automatic control means and the cycle normally prescribed thereby.

6. A drilling machine combining a tool-head, a tool spindle translatably mounted therein, an hydraulic system for effecting reciprocations of said spindle comprising an hydraulic motor connected with said spindle, a reservoir for the actuating fluid, a pump, a system of conduits connecting said reservoir, pump and motor, and rate and direction control valve means connected with said conduits to determine the rate and direction of translation of said spindle; a manually actuable element carried by said head and connected with said valve means to afford manual control of said spindle; automatic means normally actuated by the movement of said spindle and also connected with said control valve means to shift said valve means automatically in a predetermined sequence to produce a predetermined automatic cycle of movement of said spindle; and yielding means between said automatic means and said valve to permit independent actuation of said valve by the manual means to thereby independently effect a change in the cycle of movement prescribed by said automatic means.

7. In a drilling machine having a tool-head provided with a relatively reciprocable spindle;

an hydraulic system carried wholly by said head for reciprocating said spindle; valve means embodied in said hydraulic system for determining the rate and direction of reciprocation of said spindle; means directly actuated by the reciprocation of said spindle for automatically shifting said valve means thereby to effect a predetermined cycle of movement of said spindle; a manual means and operative connections with said valve operable at will to control the movement of said valve independently of said automatic control means and the cycle normally prescribed thereby; and means rendering said spindle shifted means automatically effective upon release of said manual means by the operator.

8. In a drilling machine having a tool-head provided with a relatively reciprocable spindle; an hydraulic system carried wholly by said head for reciprocating said spindle; valve means embodied in said hydraulic system for determining the rate and direction of reciprocation of said spindle; manual means carried by said tool-head to actuate said valve means to any position but normally operable to actuate said valve means to a position thereby to effect forward movement of said spindle; automatic means directly actuated by the reciprocatory movement of said spindle normally effective to actuate said valve means automatically thereby to arrest the forward movement of the spindle and to cause it to be retracted and finally to bring the spindle to rest in a predetermined retracted position; and impositive means between said automatic means and said valve permitting the automatic means to operate normally without effect upon the valve when the latter is under the control of said manual means; and means rendering said automatic means effective upon the release of the manual means by the operator.

9. A drilling machine having a tool-head; a tool spindle sleeve reciprocable therein; an hydraulic transmission for reciprocating said sleeve; valve means in said system for directly determining the rate and direction of translation of said sleeve; a manually actuable element operatively connected with said valve for actuating same thereby to control the movements of said sleeve manually; additional means including an element directly driven by said sleeve and a follower between said driven element and the said valve for controlling the movements of said sleeve automatically; and means including a lost motion connection between said manually actuable element and said follower to permit the actuation of said manual means to operate the valve at will independently of the operation normally prescribed by said automatic means, said automatic means being at all times subordinate to the manual control.

10. A drilling machine combining a tool-head; a reciprocable spindle sleeve carrying a tool spindle journaled within said head and adapted to project varying distances from one end thereof; an hydraulic system carried by said head for reciprocating said sleeve; valve means embodied in said hydraulic system to vary the rate and direction of translation of said sleeve; means driven by the translation of said sleeve to control the movement thereof, said control means including a plunger operatively connected with said valve means, means including a plurality of rotatable members journaled in the head and geared to and rotated by the reciprocation of said sleeve; accessible trip dogs carried by said rotatable members and acting at predetermined times to effect shifting of said plunger and thereby actuation of said valve means to vary the action of said hydraulic system.

11. A control for an hydraulically actuated translating means for a substantially enclosed spindle comprising a rate and direction control valve adapted to effect forward and reverse movements of the spindle and to bring it to rest; a rack translatable with said spindle; an element having a gear connection with said rack and driven thereby during translation of the spindle; a rotatable member geared to and rotated from said element comprising a plurality of relatively adjustable elements; a valve actuating member connected with said control valve; a control element connected with said valve actuating member; and accessible trip dogs carried by said relatively adjustable elements for effecting movement of said control element at predetermined times thereby sequentially to reverse the direction of movement of said spindle and to bring it to rest in a predetermined retracted position.

12. A control device as set forth in the preceding claim in which the control element comprises a plunger normally urged to a position in which it effects retraction of the spindle; in which detent means act upon the plunger normally to hold it in predetermined positions; and in which one of said trip dogs acts to release said detent means thereby to permit the plunger to move to its position to retract the spindle and another of said trip dogs shifts the plunger to a stop position.

13. A control device as set forth in claim 11 in which the control element comprises a plunger normally urged to a position in which it effects retraction of the spindle; in which manual means is provided for shifting said plunger against said urge to a position to effect forward movement of the spindle at a feeding rate; in which detent means act upon said plunger to hold it in the last named position; in which one of said trip dogs releases said detent means and permits the plunger to be moved to a position to effect retraction of the spindle; and in which another of said trip dogs engages the plunger and shifts it to a position in which it discontinues the translation of the spindle.

14. A mechanism for controlling the movements of a normally enclosed hydraulically propelled spindle sleeve comprising a member geared to and driven by the movement imparted to said sleeve; a plurality of elements carried by said member and normally accessible to the operator; a spindle translation control valve adapted in one position to effect forward movement of the spindle, and in another position to effect retraction thereof and in another position to bring it to rest; a dog carried by one of said elements and adapted to effect movement of said control valve to a position to effect retraction of the spindle; another dog carried by another of said spindle driven elements and adapted to shift said control valve to its position in which it discontinues translation of the spindle; and accessible means for individually adjusting said rotatable elements relative to the position of the spindle thereby to vary the points of reversal and stop of the spindle.

15. In combination with a normally inaccessibly translatable tool spindle and hydraulically actuated means including a spindle sleeve for effecting forward and reverse translations thereof, control means for said translating means comprising a rate and direction control valve; automatic means actuated by the translation of said spindle sleeve for actuating said control valve and comprising an endwise movable member connected with said control valve; a plurality of accessible rotatable elements rotatably driven by the translation of said spindle sleeve; trip dogs carried by said elements adapted to actuate said member to reverse and stop the translation of said spindle; means to lock said rotatable elements together to cause them to rotate synchronously; and means to effect individual rotary adjustment of said elements relative to the position of said spindle sleeve thereby to vary the points of reversal and stop of said spindle.

16. A radial drill combining an arm and a tool head translatable thereon and provided with a substantially enclosed reciprocable tool spindle; hydraulic means including a control valve means carried wholly by said translatable tool-head for reciprocating said spindle; a manual control carried by said translatable head for operating said valve means to any normal position in the cycle but normally to a position to effect a rapid advance of said spindle and for discontinuing said rapid advance and for initiating a relatively slow feeding movement thereof; and means driven by the reciprocation of said spindle to actuate said valve means to discontinue the forward feed of said spindle automatically at a preselected point and to reverse its direction of movement and automatically to stop the movement thereof by discontinuing the action of said hydraulic means at a preselected point before said spindle reaches its limit of retractive movement; and impositive connections between said last mentioned means and said valve means rendering the normal action of said means subordinate to the action of the manual control of said valve means.

17. A radial drill combining an arm member; a tool head translatable therealong; a substantially enclosed reciprocable tool spindle mounted in said head; a translatable but non-rotatable spindle sleeve for supporting said spindle; hydraulic means carried wholly by said translatable head for reciprocating said sleeve; manual control means including a control valve carried by said head for rendering said hydraulic means effective to translate said sleeve; means driven from the motion of said sleeve for cyclically actuating said valve thereby to control the duration and direction of operation of said hydraulic means thereby cyclically to control the extent and direction of the reciprocating movement imparted to said sleeve and the tool spindle supported thereby; and means intermediate said last mentioned means and said valve rendering said last mentioned means at all times subordinate to said manual control means.

18. A radial drill combining an upright column; an arm pivoted thereon; a tool head translatable on said arm provided with a substantially enclosed reciprocable spindle sleeve; hydraulic means carried by said tool head for reciprocating said sleeve; manual means for rendering said hydraulic means effective; means including a follower and a trip dial mechanism operatively connected with said sleeve and driven by the movement thereof to control the duration and direction of operation of said hydraulic means and thereby the direction of movement of said sleeve and the extent of movement in each direction, and accessible trip dogs adjustably carried by said dial mechanism for adjusting the points of reversing and stopping of the movements hydraulically imparted to said sleeve.

19. In combination with a translatable tool spindle carrier and hydraulic means for effecting forward and reverse translations thereof, control means for said translating means comprising a rate and direction control valve; automatic means actuated by the translation of said spindle carrier for actuating said control valve and comprising an endwise movable member connected with said control valve, a plurality of rotatable elements rotated by the translation of said spindle carrier, trip dogs carried by said elements adapted to actuate said member to reverse and stop the translation of said spindle; means electively to lock said rotatable elements together to cause them to rotate synchronously or to effect individual rotary adjustment of said elements relative to the position of said spindle carrier thereby to vary the points of reversal and stop of the spindle comprising an internal gear formed upon each of said elements, portions of said gears being arranged side by side with their teeth in alignment, an axially movable third gear adapted to mesh with said internal gears, said third gear being shiftable out of engagement with one of said internal gears while maintained in engagement with the other and then manually rotatable to effect angular adjustment of the engaged element.

LAWRENCE L. SCHAUER.
JOHN H. McKEWEN.